US009121762B2

(12) United States Patent
Williams et al.

(10) Patent No.: US 9,121,762 B2
(45) Date of Patent: Sep. 1, 2015

(54) DISCRIMINATING PHOTO COUNTS AND DARK COUNTS IN AN AVALANCHE PHOTODIODE OUTPUT

(71) Applicant: Voxtel, Inc., Beaverton, OR (US)

(72) Inventors: George M. Williams, Beaverton, OR (US); Andrew S. Huntington, Beaverton, OR (US)

(73) Assignee: Voxtel, Inc., Beaverton, OR (US)

( * ) Notice: Subject to any disclaimer, the term of this patent is extended or adjusted under 35 U.S.C. 154(b) by 293 days.

(21) Appl. No.: 13/891,829

(22) Filed: May 10, 2013

(65) Prior Publication Data

US 2013/0299673 A1 Nov. 14, 2013

Related U.S. Application Data

(60) Provisional application No. 61/645,159, filed on May 10, 2012.

(51) Int. Cl.
*G01J 1/44* (2006.01)
*G01J 1/18* (2006.01)

(52) U.S. Cl.
CPC ..... *G01J 1/18* (2013.01); *G01J 1/44* (2013.01)

(58) Field of Classification Search
CPC ........................ H01L 31/107; H01L 29/66113
USPC .......................................... 250/206.1, 214 R
See application file for complete search history.

(56) References Cited

U.S. PATENT DOCUMENTS

| | | | | |
|---|---|---|---|---|
| 6,747,296 | B1 | 6/2004 | Clark | |
| 6,960,771 | B1 * | 11/2005 | Suyama et al. | 250/363.01 |
| 7,432,537 | B1 | 10/2008 | Huntington | |
| 8,698,268 | B2 | 4/2014 | Yagyu et al. | |
| 2007/0029485 | A1 | 2/2007 | Beck et al. | |
| 2008/0152358 | A1 * | 6/2008 | Uto | 398/202 |

OTHER PUBLICATIONS

Dalla Betta et al. Avalanche Phtododiodes in Submicron CMOS Technologies for High-Sensitibity Imaging, Advances in Phtodiodes, Mar. 2011, pp. 225-248, InTech, [online].

* cited by examiner

*Primary Examiner* — Renee D Chavez

(57) ABSTRACT

The output of an avalanche photodiode (APD) comprises a "photocurrent" component comprising photon initiated events resulting from the interaction of photons with the APD and a "dark current" component comprising dark carrier events arising in the APD even when the APD is not exposed to light. Differences in the pulse height distributions of photon initiated events and dark carrier initiated events are used to statistically discriminate between photocurrent and dark current components of APD output.

26 Claims, 5 Drawing Sheets

PROBABILITY
110
112
115
114
116
118
66
VOLTS
$V_{amplified\ mean\ photon\ signal}$
$V_{threshold}$

DISCRIMINATING PHOTO COUNTS AND DARK COUNTS IN AN AVALANCHE PHOTODIODE OUTPUT

CROSS-REFERENCE TO RELATED APPLICATIONS

This application claims the benefit of U.S. Provisional Application No. 61/645,159, filed May 10, 2012 which is incorporated herein by reference in its entirety.

BACKGROUND OF THE INVENTION

The present invention relates to a photoreceiver and, more particularly, to a method and apparatus for discriminating between photon initiated signals and dark signals arising in the absence of interaction with a photon in an avalanche photodiode of a photoreceiver.

A photodiode is a semiconductor device which absorbs and transforms light into an electric current. Detection of an electrical event, an electrical pulse or electric current, at the output of the photodiode evidences the interaction of light with the photodiode. The electrical current generated by the absorption of light in the photodiode is called "photocurrent" and the ratio of the magnitude of the photocurrent, in amperes, to the incident luminous power, in watts, is the photodiode's "responsivity." An avalanche photodiode (APD) is a photodiode exhibiting increased responsivity due to internal amplification of the photocurrent through impact-ionization in which "charge carriers," electrons or holes, with sufficient kinetic energy can knock a bound electron out of its bound state in the valence band of a semiconductor and promote it to a state in the conduction band, creating an electron-hole pair. APDs are particularly useful for detecting weak luminous signals because their high responsivity boosts the photocurrent signal relative to noise produced by sources in the detection system downstream of the photodiode. However, the benefit of avalanche multiplication comes at the expense of an increase in "shot noise" by APD excess noise factor which is a measure of gain uncertainty.

Moreover, electric current flows in a photodiode or APD even in the absence of illumination. This "dark current" is a spurious output signal which itself has an increase in shot noise by an excess noise factor, a result of the quantization of the electric current's constituent charge, which causes the output of the APD to fluctuate about its mean value in the absence of light. Since individual charge carriers of either polarity, electrons and holes, are indistinguishable, the current resulting from photon generated electrons or holes, "photocarriers," cannot be distinguished from the current resulting from electrons or holes generated by other processes, such as "dark carriers," and the total current flowing in the APD cannot be segregated into photocurrent and dark current by inspection.

What is desired, therefore, is a method of discriminating photon induced current events and dark current events produced by an APD.

DETAILED DESCRIPTION OF PREFERRED EMBODIMENTS

Figure 1:
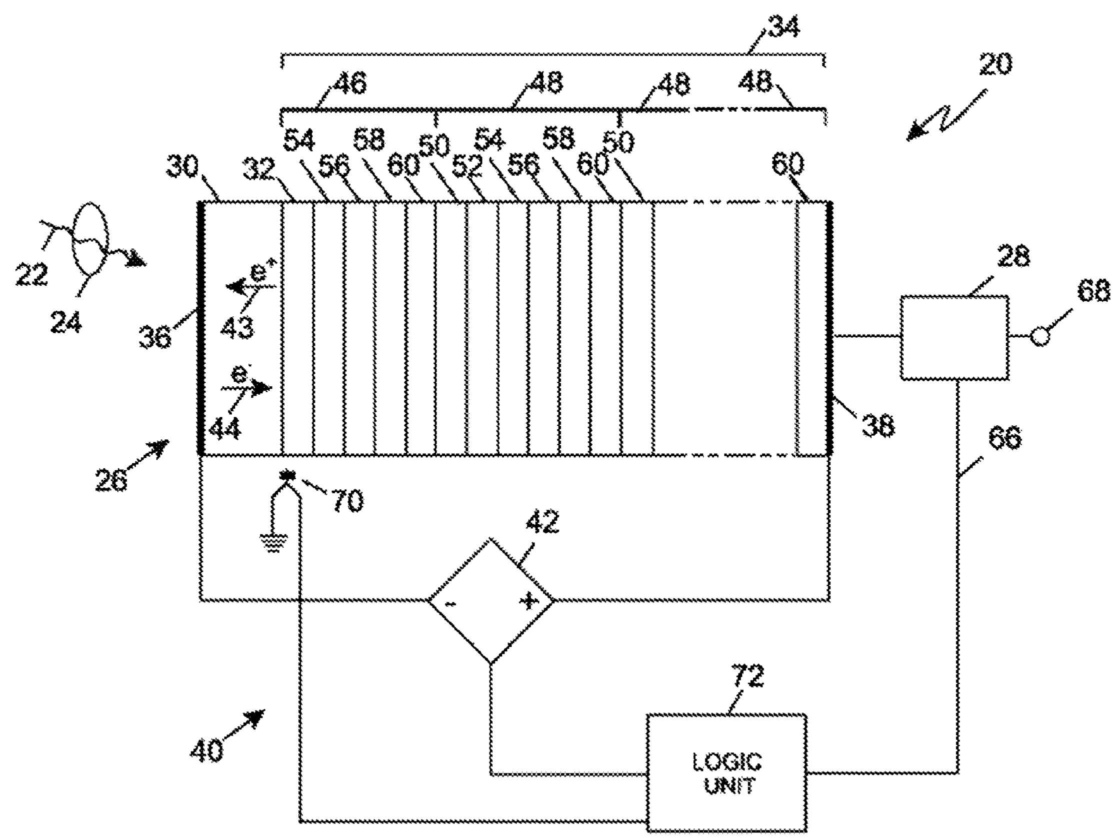
FIG. 1 is a block diagram of an exemplary photoreceiver including an avalanche photodiode (APD).
Figure 2:
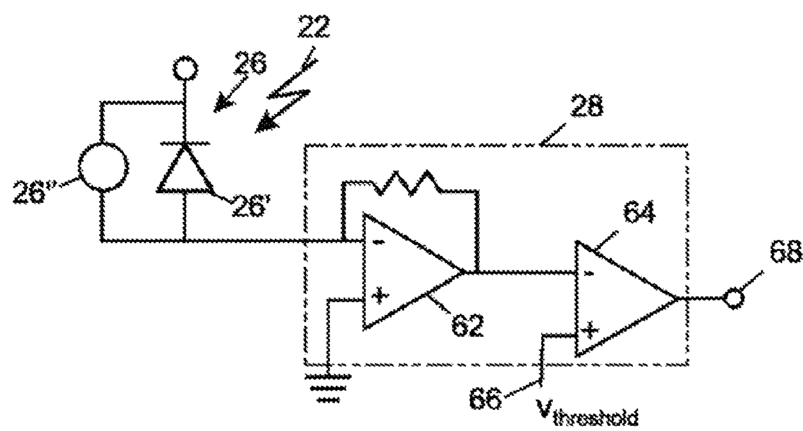
FIG. 2 is a schematic representation of an exemplary photoreceiver.

Referring in detail to the drawings where similar parts are identified by like reference numerals, and, more particularly to FIGS. 1 and 2, in an exemplary photoreceiver 20, such as is used in a laser range finder or a direct detection laser detection and ranging device (LADAR), incident light, one or more photons 22, impinges on the device's optics 24 and is focused on an avalanche photodiode (APD) 26. In the APD, one or more photons are converted to an electrical signal, a photogenerated current comprising photon induced events or pulses, which is transmitted to a detector decision circuit 28 which detects the electrical signal and, thereby, the interaction of the photon or photons with the APD. The popularity of APDs in high speed photoreceivers is attributable to the APD's high internal optoelectronic gain which enables the photogenerated current to dominate the thermal noise of sources in the photoreceiver circuitry without the need to amplify the incident light. The optoelectronic gain of the APD is the result of a cascade of charge carrier impact ionizations in a strong electric field in an intrinsic multiplication layer of the APD.

The exemplary separate absorption, charge and multiplication avalanche photodiode (SACM APD) 26 comprises generally an absorption region 30, a charge region 32 and a multiplication region 34 (indicated by a bracket) arranged between an anode 36 and a cathode 38 which are interconnected by a biasing circuit 40. The biasing circuit 40 comprises a voltage source 42 which exerts an electrical potential between the anode 36 and the cathode 38 producing an electric field in the APD. The strength of the electric field can be varied by adjusting the magnitude of the electrical potential, the bias, exerted by the biasing circuit 40. Current does not flow freely between the anode and the cathode because a positive voltage is applied to the cathode and a negative voltage is applied to the anode so the diode junction is reverse biased by the resulting electric field.

A photon 22, entering the absorption region 30 of the APD 26, generates an electron-hole pair comprising a positively charged hole 43 which under the influence of the electric field drifts toward the anode 36 and a photoelectron 44 which drifts toward the cathode 38 into the charge region 36 and then into the multiplication region 34 of the APD. Preferably, the multiplication region 34 of the APD comprises plural discrete heterostructured gain stages 46, 48 (indicated by brackets) each comprising an ordered sequence of layers preferably including a first field up layer 50, a first intrinsic layer 52, a second field up layer 54, a second intrinsic layer or ionization layer 56, a field down layer 58 and a relaxation layer 60. The charge region 32 functions as the first field up layer and the first intrinsic layer of the gain stage 46 nearest the anode. U.S. Pat. No. 7,432,537, incorporated herein by reference, discloses in detail the construction and linear mode operation of an exemplary SACM APD with multiple heterostructured gain stages.

Figure 3:
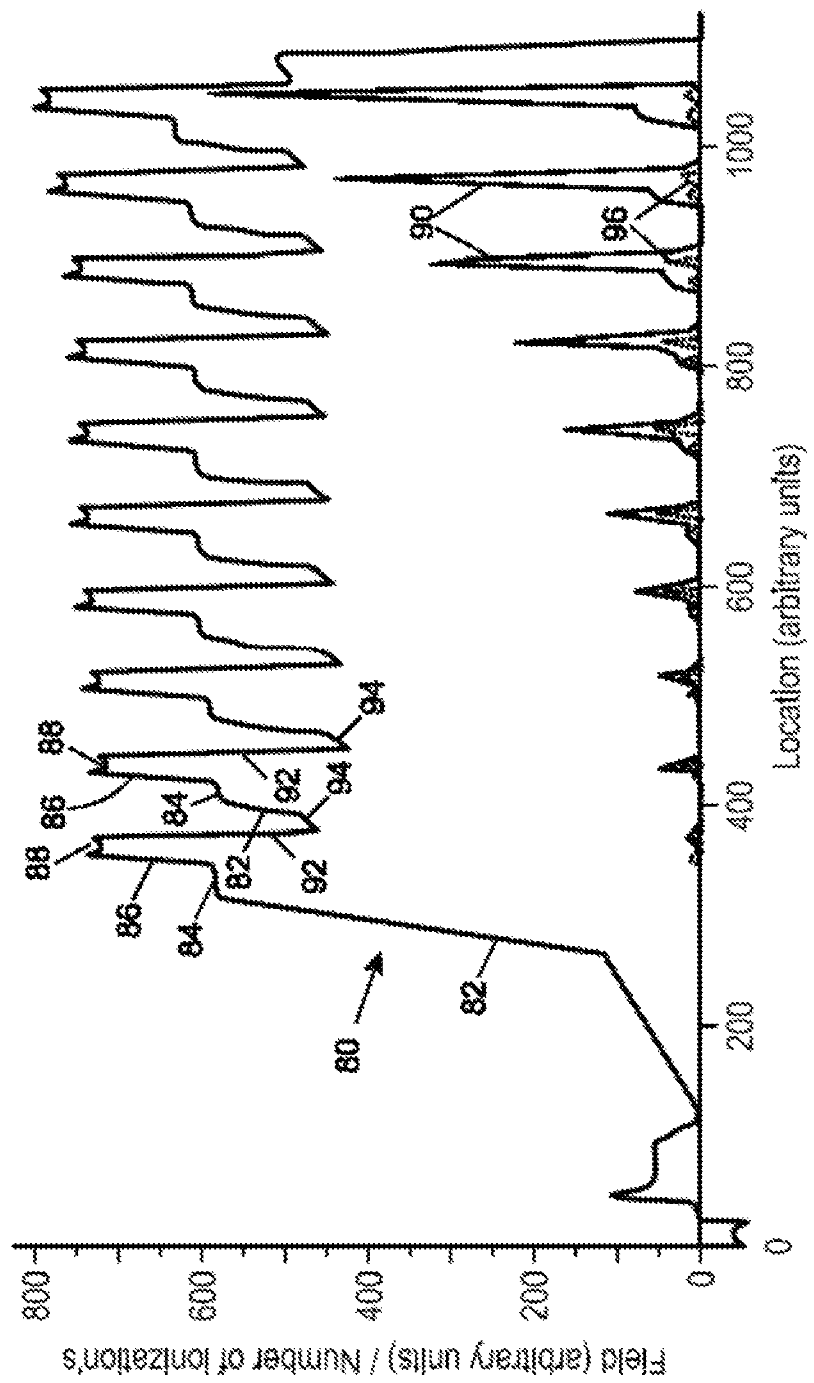
FIG. 3 is an illustration of electric field strength and the locations of electron and hole initiated impact ionization of a 10-stage, separate absorption, charge and multiplication avalanche photodiode (SCAM APD).

In an APD having separate absorption and multiplication regions, avalanche multiplication of photocurrent is initiated by the carrier type that drifts from the absorption region to the multiplication region and in the reverse biased exemplary SACM APD 26, the absorption and multiplication regions are ordered such that photoelectrons are injected into the multiplication region from the absorption region. Referring also to FIG. 3, when an electron 44 drifts into the multiplication region 34 from the absorption region 36, it accelerates in a strengthening portion 82 of the electrical field 80 of a first portion of the charge region 36 in the case of the first gain stage 46 or the first field up layer 50 of subsequent gain stages 48. The electron continues to drift through the charge region toward the cathode and into a second portion of the charge region where the electric field is not increased 84. Similarly, in subsequent gain stages 48, the electron drifts out of the first field up layer 50 into the first intrinsic layer 52 where the electric field remains constant 84 and the electron can lose energy due to collisions in the undoped layer. The electric field is again increased 86 in a second field up layer 54 accelerating the electron above the saturation velocity so that when electrons enter the second intrinsic or ionization layer 56 a portion of the electrons has sufficient kinetic energy to impact ionize. The strength of the electric field is maximized 88 in the ionization layer and the material of the ionization layer is selected to have a lower band gap and, consequently, a lower ionization threshold than the material of the other layers of the multiplication region. A portion of the charge carrier population accumulates enough kinetic energy between scattering events to induce creation of new electron-hole pairs 90 pushing an electron from the valence band into the conduction band while leaving a hole behind.

Electrons pass from the ionization layer to a field down layer 58 where the electric field strength is rapidly reduced 92 below the level required to sustain impact ionization. From the field down layer, the electrons drift to a relaxation layer 60 where a weak field 94 is maintained and the energy of the electrons is reduced by normal scattering so that the electrons arrive at the first field up layer 50 of the next gain stage 48 with relatively uniform, lower energy. As the electrons 44 drift toward the cathode 38 the impact ionization process is repeated in each gain stage 48 and the number of electrons increases substantially linearly 90 in an APD biased below the breakdown voltage so as to operate in the linear mode. During the time of the transport of the initial photoelectron and its progeny through the APD junction, assuming single carrier ionization, the optoelectronic gain for the APD is the gain for each gain stage raised to a power equal to the number of stages. For example, for an APD with stage gain of m=1.8, a five stage cascaded multiplication region can achieve a device gain of M=18.9 ($1.8^6$) and a ten stage cascaded multiplication region can achieve a device gain M=357 ($1.8^{10}$).

On the other hand, the ionization layer 56 is sized so that secondary holes 96 created in the ionization layer by impact ionization cannot gain sufficient energy to cause further ionization before they drift out of the high-field region and while a hole 96 created by impact ionization in the ionization layer 56 will tend to accelerate toward the anode 36 it will pass out of the ionization layer to the second field up layer 54 on the anode side of the ionization layer before sufficient energy is gathered to cause further ionization. Although the hole may continue to accelerate, the reduced strength of the electric field and the greater bandgap of the material making up the second field up layer reduce the probability that the hole will ionize. When the hole passes into the first intrinsic layer 52 it will lose energy due to collisions so that when the hole enters the ionization layer of the next gain stage it will have too little energy to impact ionize. As illustrated in FIG. 3, the number of electron-initiated ionization events 90 grows with each gain stage 48 as the initial photoelectron 44 passes through the multiplication region 34 and creates more progeny electron-hole pairs, but the probability of hole-initiated ionization is minimal. In this fashion, the portion of the APD's responsivity related to electron-initiated ionization events is enhanced while that of holes is suppressed and feedback is minimized.

The exemplary photoreceiver 20 includes a decision circuit 28. The exemplary decision circuit 28 comprises a transimpedance amplifier 62 which converts the current output by the APD 26 to a voltage and a threshold comparator 64 which outputs 68 a "count" when the input voltage from the transimpedance amplifier exceeds a threshold voltage 66. On other hand, a decision circuit of photoreceiver might comprise a transimpedance amplifier having an output current and a threshold comparator comparing the output of the transimpedance amplifier to a threshold current. The transimpedance amplifier is by nature noisy and by setting the threshold voltage high enough to account for an estimate the amplifier's noise, the output of the decision circuit reflects the output of the APD. However, the output of the APD comprises both photocurrent, arising from the interaction of light with the APD, and dark current comprising dark counts or events arising within the APD even in the absence of the APD's exposure to light. Since photo generated charge carriers, "photocarriers," of either polarity, electrons and holes, are indistinguishable from "dark carriers," electrons or holes generated by other processes, the total current flowing from the APD cannot be segregated into photocurrent and dark current.

A dark count is an avalanche event which is not induced by a carrier generated by a photon and an electric current known as "dark current" flows in an APD even in the absence of illumination. The APD 26 is represented schematically as a diode 26' and, in parallel with the diode, a dark current generator 26" which is the source of dark events or pulses. In SACM APDs, non-photon generated dark counts or events arise primarily from the injection of charge carriers into the semiconductor junction as a result of thermal excitation, tunneling across the depletion region and emission by trapping centers. Thermal excitation can provide a source of dark current by causing charge carriers to transfer from the valence band to the conduction band, either directly or by way of a midgap defect. In addition, the strong electric field required to drive impact-ionization can also cause electrons to quantum tunnel through the potential energy barrier separating the valence band and the vacant conduction band states in the narrow bandgap semiconductor alloys used in the ionization layers of the gain stages. Tunnel leakage in the multiplication region of an APD can be the dominant source of dark events and this is particularly true of APDs which are cooled during operation and APDs, such as SACM APDs, which are designed for low excess noise, a statistical noise inherent in the multiplication process. Chemical impurities and lattice defects in the multiplier also create mid-bandgap trap states which reduce the effective energy barrier to quantum tunneling. The mid-bandgap trap states divide the dark current generation process into sequential steps each requiring penetration of lower potential energy barrier than the full bandgap of the semiconductor material. The trap assisted tunneling process is relatively insensitive to device temperature because carrier generation is via quantum tunneling through the potential energy barrier rather than thermal promotion of carriers over the barrier. In addition, impurities and crystal defects can result in charge traps and the high current in the junction results in a probability that the charge traps will be filled with a carrier which is released later initiating a second pulse or "after pulse." Many types of APDs, including APDs manufactured from InP, InGaAs and $In_{0.52}Al_{0.48}As$, exhibit a dark current generation rate at high bias which scales linearly with trap concentration in the multiplier, exponentially with the applied reverse bias and which has a weaker exponential dependence upon temperature.

While both photocarriers and dark carriers are subject to avalanche multiplication, the respective types of carriers are generated by different mechanisms and, as result, exhibit differing pulse height distributions, that is, the variation of the magnitude of the output pulses at a constant applied voltage. While the portions of the total output current of the APD attributable respectively to photon induced events and dark events cannot be determined, the inventors concluded that the differences in pulse height distribution for dark current and photocurrent could be exploited to statistically distinguish between photon induced pulses and dark pulses, that is, pulses not induced by interaction of a photon with the APD.

All primary photocarriers, photoelectrons 44 in the exemplary photoreceiver 20, are generated in the absorption region 30 and are injected into multiplication region 34 at one end of the multiplication region and pass through the multiplication region on the maximum possible path length. When a secondary electron-hole pair is generated in one of the ionization layers of the multiplication region, the electron travels toward the cathode and the hole travels toward the anode but neither secondary carrier, hole nor electron, traverses the maximum path length through the multiplication region. A population of dark current carriers is generated within the absorption region 30 and, like the photoelectrons 44 pass through the multiplication region 34 on the maximum possible path length. Another population of dark current carriers are generated within the multiplication region and, like the secondary carriers, the path through the multiplication region 34 traversed by a dark carrier, either a dark electron or a dark hole, will depend on where the dark carrier originated. Since gain occurs in the spatially discrete gain stages of the multiplication region, the contribution of each dark carrier to the dark count or current will depend on where the dark carrier arose. For example, in the simplified case of single carrier ionization, in a 10 stage APD with a gain 1.8 per stage, one tenth of the dark carriers can be expected to arise in the tenth stage and experience no gain. A second tenth of the dark carriers can be expected to arise in the ninth, the second to last, stage and experience a gain of 1.8 and so forth. Since generation of dark carriers by tunneling will be localized in the respective multiplication layers 56 where the electric field is strongest and the band gap the narrowest and will have too little energy to impact ionize in the gain stage in which they are generated, a primary dark electron generated in the $i^{th}$ stage of the multiplication region will experience an average gain of approximately:

$$M_i = \Pi^{s}_{j=i+1} mj \tag{1}$$

where: $M_i$=average gain mj=average gain of the jth multiplication stage.

The average gain (Mi) is an approximation because equation (1) does not account for the counter propagating holes which are generated with the electrons and which have a finite chance of triggering impact ionization in the earlier gain stages of the multiplication region.

Assuming a uniform probability of primary dark carrier generation in each stage, in the case of largely single carrier ionization, the pulse height distribution of the dark current from all stages of the multiplication region is approximated by the weighted average of the pulse height distributions of dark electrons generated in each stage:

$$PHD_{dark} = \frac{1}{s}\sum_{s} PHD(i) \tag{2}$$

where: $PHD_{dark}$=pulse height distribution of all stages, and

PHD(i)=normalized pulse height distribution for primary carrier generation in $i^{th}$ stage.

The pulse height distribution for each gain stage can be approximated by the McIntyre distribution:

$$P_m(i) \approx \frac{a \times \Gamma\left(\frac{n}{1-k} + 1\right)}{n \times (n-a)! x \Gamma\left(\frac{k \times n}{1-k} + 1 + a\right)} \times \left(\frac{1 + k(M_i - 1)}{M_i}\right)^{a \times \frac{k \times n}{1-k}} \times \left(\frac{(1-k)(M_{i-1})}{M_i}\right)^{n-a} \tag{3}$$

where: a is the number of primary dark electrons, n≥a is the output level for which a probability is to be calculated, k is the hole to electron ratio for impact ionization, and the Euler gamma function is defined as $\Gamma(z)=\int_0^\infty dt\, t^{z-1}\exp(-t)$.

While equation (3) does not account for hole feedback into earlier stages of the multiplication region and the resulting probability of hole initiated impact ionization in earlier gain stages, k is small for an SACM APD and the approximation is reasonable.

Figure 4:
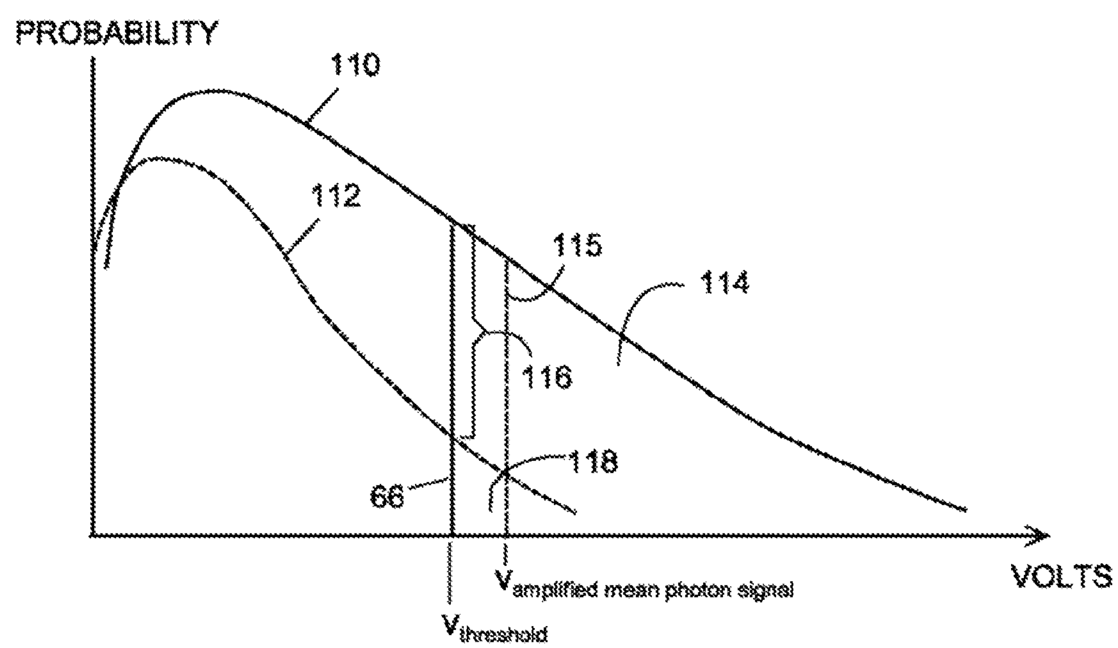
FIG. 4 is a graphical representation of the respective pulse height distributions of photocurrent and dark current output by an exemplary separate absorption, charge and multiplication avalanche photodiode.

Referring also to FIG. 4, since primary photocarriers are generated by interaction between photons 22 and the material of the absorption region 30 of the APD and are injected into the multiplication region 34 to traverse the maximum path length in the APD, the pulse height distribution of the photon induced pulses or events 110 is different than the pulse height distribution of dark carrier pulses or events 112 which are not initiated by photon interaction with the APD but which arise by way of thermal and tunneling events distributed throughout the spatially separated ionization layers 56. The inventors reasoned that the number of correctly detected photon induced events 114 could be maximized while the number of false alarms, "false counts" 118, arising from incorrectly discriminated dark events could be minimized by setting the decision circuit's threshold voltage 66 to the voltage maximizing the difference 116 (indicated by a bracket) between the pulse height distribution for dark current 112 and the pulse distribution for photocurrent 110. Similarly, the number of correctly detected pulse events could be maximized if a central tendency, for example, the mean voltage of a plurality of pulses 115 or a current, exceeded the threshold 66. Since dark carrier generation and dark carrier pulse height distribution varies with temperature and the bias of the APD, the exemplary photoreceiver 20 includes a temperature sensing element 70, for example a thermocouple, communicatively connected to a logic unit 72, such as a data processing unit operating according program instructions, to vary the threshold voltage 66 of the decision circuit 68. Likewise, the pulse height distributions of the photocurrent 110 and the dark current 112 vary with the bias applied to the APD and the logic unit 72 is connected to the variable voltage source 42 of the bias circuit 40 to control the bias voltage and to adjust the threshold voltage 66 to maximize the difference between the photocurrent and dark current pulse height distributions in response to a change in the bias voltage.

A false count rate (FCR) for a photoreceiver can be modeled as a sum of the electronic noise count rate originating solely from circuit noise in the transimpedance amplifier connected to the APD and a dark count rate determined by convolution of the transimpedance amplifier noise with the amplified dark current in the output of the APD:

$$FCR=ENC_{TIA}+DCR_{APD} \quad (4)$$

where: FCR is the false count rate, $ENC_{TIA}$ is the electronic noise count of the transimpedance amplifier, and $DCR_{APD}$ is the dark current count rate.

And, the electronic noise count of the transimpedance amplifier is:

$$ENC_{TIA}=\text{rate}_{TIA}\times\int_{n=threshold}^{\infty} dn PHD_{TIA}(n) \quad (5)$$

where: $\text{rate}_{TIA}$ is the minimum separation between consecutive pulses that can be resolved and counted separately, and $PHD_{TIA}$ is the pulse height distribution of the transimpedance amplifier which is often modeled as a Gaussian distribution centered at n=0.

The dark count rate (DCR) is determined in a similar manner where the amplitude distribution of darks counts from the APD is determined by convolving the transimpedance amplifier's noise with the mean pulse height distribution of the APD's dark generated carriers as might be determined in equation (2):

$$PHD_{APD}=P\otimes D_{TIA}PHD_{APD} \quad (6)$$

Figure 5:
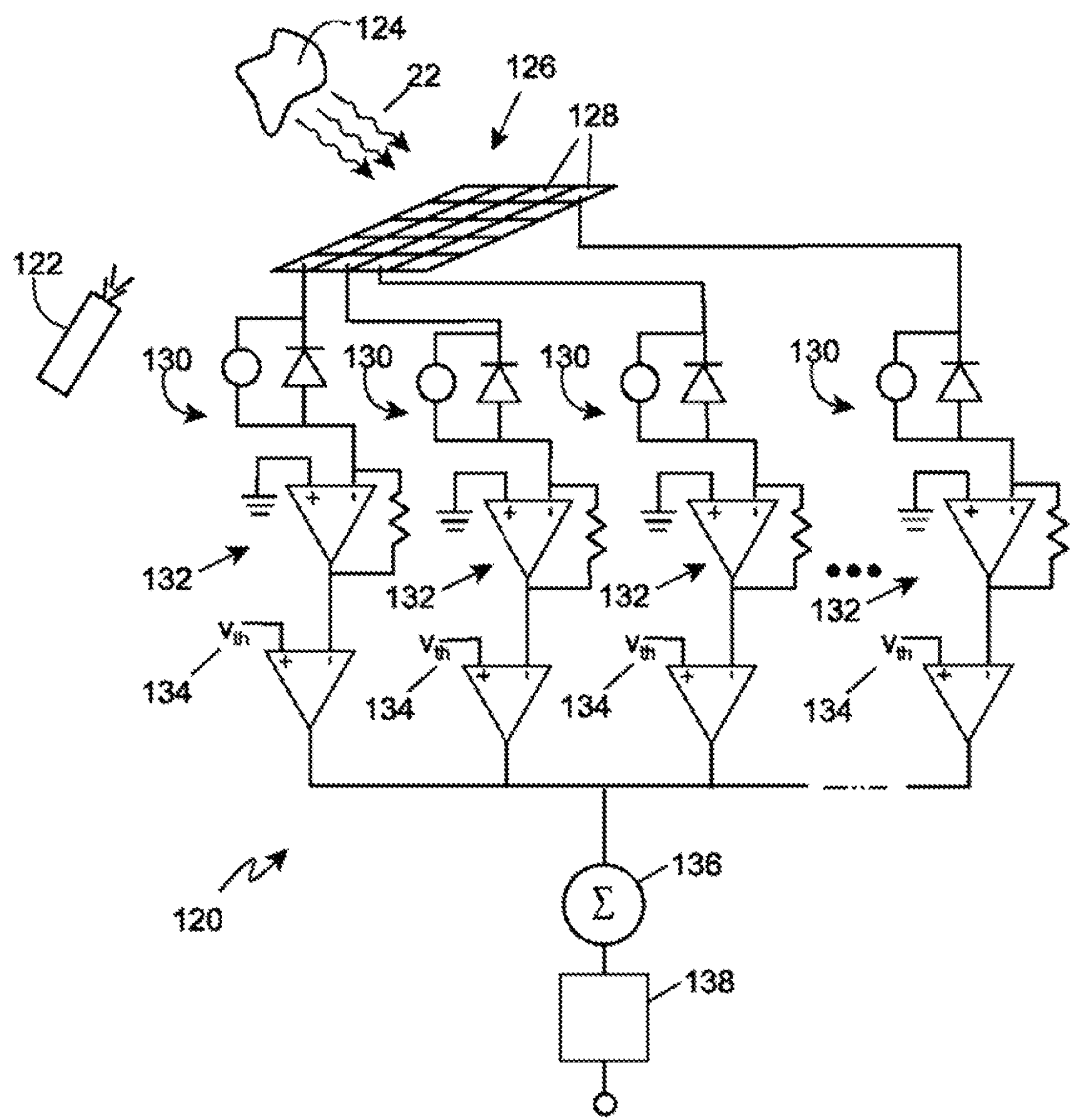
FIG. 5 is a block diagram of a laser detection and ranging device (LADAR).

Referring also to FIG. 5, a LADAR system 120 includes a laser 122 arranged to illuminate a surface 124 to be ranged with a pulse of light. Photons 22 reflected from the surface are detected by a photoreceiver and analyzed to determine the distance from and/or speed of the surface 124 relative to the photoreceiver. The inventors concluded that the accuracy of the LADAR system could be improved if the threshold voltage of the system's detector maximized the difference between the pulse height distribution of photocurrent events and dark current events and the detection of events was correlated for time. In the LADAR system 120, the laser 122 transmits pulses of light which are reflected from the surface 124 to a detection surface 126. The area of the detection surface 126 is divided into a plurality of subareas 128 each of which focuses one or more photons 22 on a respective one of a plurality of photoreceivers 130. The photo receivers include respective decision circuits 132 each having a threshold voltage 134 which maximizes the difference between the pulse height distributions of the photocurrent and the dark current of the photoreceiver. Electrical events detected by the plural photoreceivers are summed 136 and output to a second decision circuit 138 which detects summed outputs exceeding a threshold. Since dark current events occurring in the respective receivers are not time correlated and photocurrent events arising from the interaction of coherent photons of the reflected light pulse with the ones of the plural receivers are time correlated, summed events exceeding a threshold in the second decision circuit are more likely correctly detected photocurrent events and less likely false alarms.

Figure 6:
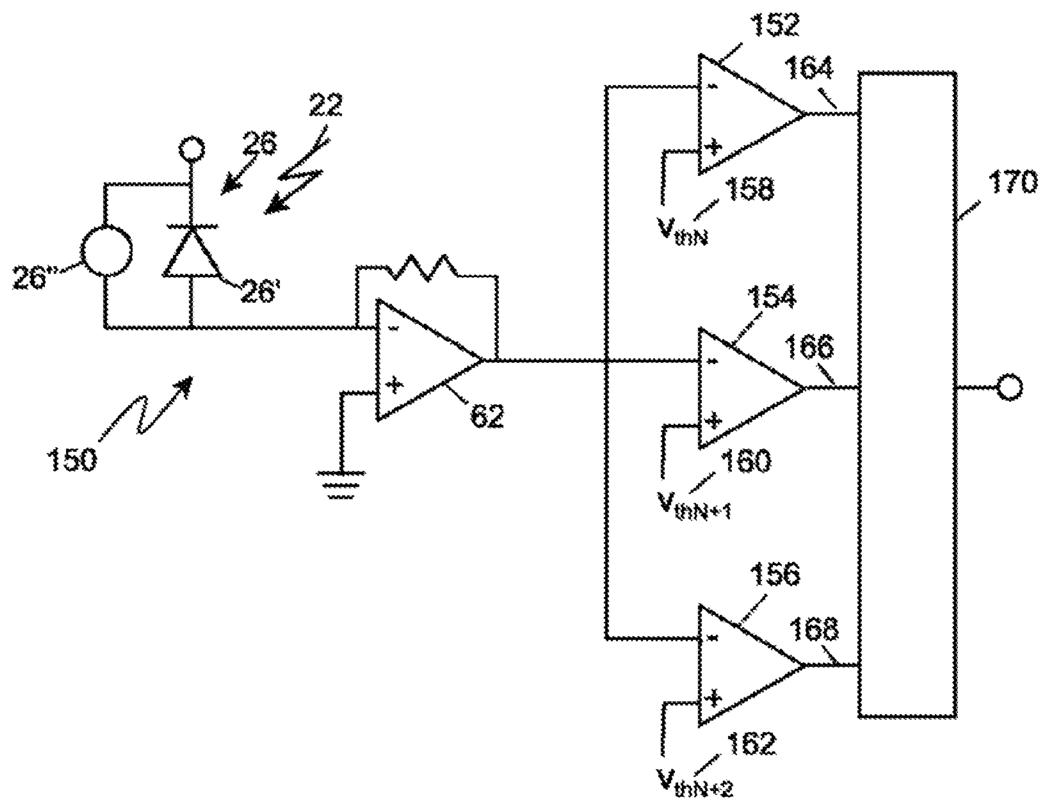
FIG. 6 is a schematic representation of a photodiode including plural threshold comparators and a secondary decision circuit.
Figure 7:
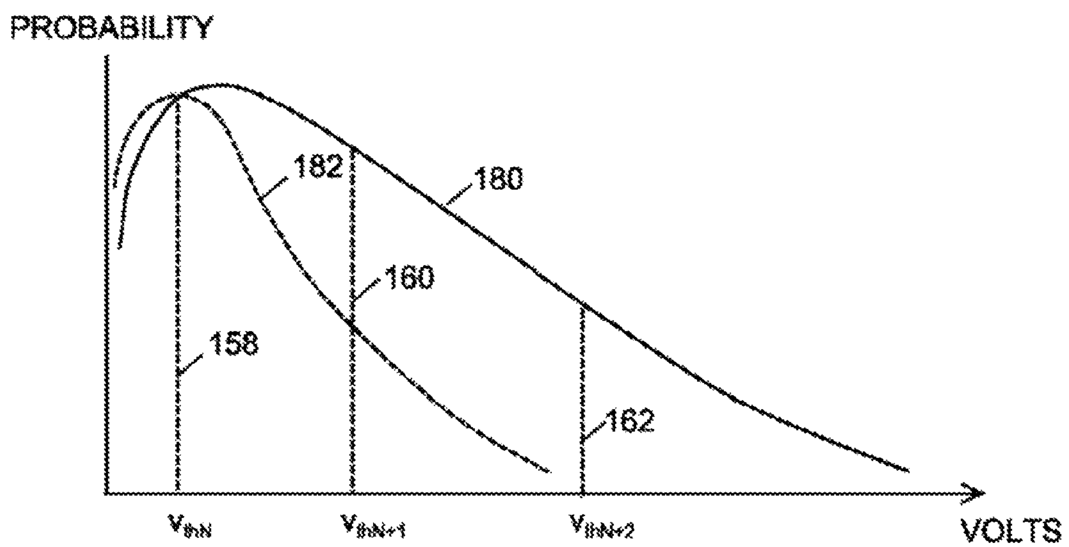
FIG. 7 is a graphical representation of plural threshold voltages and respective pulse height distributions of photocurrent and dark current output by a separate absorption, charge and multiplication avalanche photodiode.

Referring also to FIGS. 6 and 7, another embodiment of a photoreceiver 150 comprises a photodiode 26 and a transimpedance amplifier 62 to convert the current output by the photodiode to a voltage. The output of the transimpedance amplifier is transmitted to plural threshold comparators 152, 154, 156 each biased to a different threshold voltage; $v_{thn}$ 158, $v_{thn+1}$ 160, $v_{thn+2}$ 162. Each of the threshold voltages, $v_{thn}$ 158, $v_{thn+1}$ 160, $v_{thn+2}$ 162, corresponds to a pair of photocurrent and dark current probability values where the respective threshold voltage intersects the photocurrent pulse height distribution 180 and the dark current pulse height distribution 182. Preferably, one of the threshold voltages 158 is selected to minimize the difference between dark pulse height distribution 182 and the photocurrent pulse height distribution 180, a second threshold voltage 160 is selected to maximize the difference between the dark pulse height distribution and the photocurrent pulse height distribution and a third threshold voltage 162 is a voltage exceeding the maximum voltage of dark pulses. The outputs of the threshold comparators 164, 162, 168 are input to a secondary decision circuit 170 which applies a second decision criterion, for example, designating a pulse having a value exceeding a central tendency, such an average or mean, of said three thresholds as a photon induced pulse.

Unlike photocarriers, dark carriers do not experience gain in all of the gain stages of the multiplication region and, therefore, the average gain of dark carriers is different than that of photocarriers. Since the pulse height distributions comprise, respectively, the amplitudes of the photocurrent count events and the amplitudes of the dark count events, the pulse height distribution of the photocurrent will be different than the pulse height distribution of the dark current and the difference can be used to statistically discriminate between photon induced events and dark events.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method of distinguishing a photon induced pulse emitted by a photodiode from a dark pulse emitted by said photodiode absent photon interaction, plural photon induced pulses emitted by said photodiode having a first pulse height distribution and plural dark pulses having a second pulse height distribution, said method comprising the step of designating a pulse having a measured parameter greater than a threshold measurement of said parameter as a photon induced pulse, said threshold selected to maximize a difference between said first pulse height distribution and said second pulse height distribution.

2. The method of distinguishing a photon induced pulse of claim 1 wherein said measured parameter is a voltage.

3. The method of distinguishing a photon induced pulse of claim 1 further comprising the step of changing said threshold in response to a change in a bias applied to said photodiode.

4. The method of distinguishing a photon induced pulse of claim 1 further comprising the step of changing said threshold in response to a change of a temperature of said photodiode.

5. The method of distinguishing a photon induced pulse of claim 1 wherein the step of designating a pulse having a measured parameter greater than a threshold measurement of said parameter as a photon induced pulse comprises the steps of:

(a) measuring said parameter for each of a plurality of pulses; and (b) designating said plurality of pulses as photon induced if a central tendency of said measurements of said parameter for said pulses exceeds said threshold.

6. The method of distinguishing a photon induced pulse of claim 5 further comprising the step of changing said threshold in response to a change in a bias applied to said photodiode.

7. The method of distinguishing a photon induced pulse of claim 5 further comprising the step of changing said threshold in response to a change of a temperature of said photodiode.

8. A method of distinguishing a photon induced pulse emitted by a photodiode from a dark pulse emitted by said photodiode absent photon interaction, plural photon induced pulses having a first pulse height distribution and plural dark pulses having a second pulse height distribution, said method comprising the step of designating a pulse having a measured parameter greater than a threshold measurement of said parameter as a photon induced pulse, said threshold a relationship of plural thresholds, at least one threshold comprising a value of said measured parameter selected to maximize a difference between said first pulse height distribution and said second pulse height distribution.

9. The method of distinguishing a photon induced pulse of claim 8 wherein at least one of said plural thresholds comprises a value of said parameter minimizing a difference between said first pulse height distribution and said second pulse height distribution.

10. The method of distinguishing a photon induced pulse of claim 8 wherein at least one of said plural thresholds comprises a value of said measured parameter exceeding a maximum value of said measured parameter for a dark pulse.

11. The method of distinguishing a photon induced pulse of claim 8 wherein the step of designating a pulse having a measured parameter greater than a threshold measurement of said parameter as a photon induced pulse comprises the steps of:

(a) measuring said parameter for a plurality of pulses; and (b) designating said plurality of pulses as photon induced if a central tendency of said measured parameters of said pulses exceeds said threshold.

12. The method of distinguishing a photon induced pulse of claim 8 further comprising the step of changing said threshold in response to a change in a bias applied to said photodiode.

13. The method of distinguishing a photon induced pulse of claim 8 further comprising the step of changing said threshold in response to a change of a temperature of said photodiode.

14. A method of distinguishing a photon induced pulse emitted by at least one of plural photodiodes from a dark pulse emitted by one or more of said plural photodiodes absent photon interaction, plural photon induced pulses having a first pulse height distribution and plural dark pulses having a second pulse height distribution, said method comprising the steps of:

(a) summing an emission by said plural photodiodes, said emission comprising at least one pulse;

(b) designating a pulse as a photon induced pulse if a measured parameter of said emission exceeds a threshold measurement of said parameter selected to maximize a difference between said first pulse height distribution and said second pulse height distribution.

15. The method of distinguishing a photon induced pulse of claim 14 wherein said measured parameter is a voltage.

16. The method of distinguishing a photon induced pulse of claim 14 further comprising the step of changing said threshold in response to a change in a bias applied to at least one photodiode.

17. The method of distinguishing a photon induced pulse of claim 14 further comprising the step of changing said threshold in response to a change of a temperature of at least one photodiode.

18. The method of distinguishing a photon induced pulse emitted by at least one of said plural photodiodes of claim 14 wherein the step of designating a pulse having a measured parameter greater than a threshold measurement of said parameter as a photon induced pulse comprises the steps of:

(a) measuring said parameter for a plurality of pulses; and (b) designating said plurality of pulses as photon induced if a central tendency of said measured parameters of said pulses exceeds said threshold.

19. A photoreceiver comprising:

(a) a photodiode arranged to emit an electrical pulse as a result of interaction with a photon and emitting a dark pulse absent interaction with a photon; and (b) a decision circuit to designate a pulse emitted by said photodiode as a photon induced pulse if a measured parameter of said electrical pulse exceeds a threshold value of said measured parameter, said threshold comprising a value of said measured parameter selected to maximize a difference between a pulse height distribution of plural photon induced pulses emitted by said photodiode and a pulse height distribution of plural dark pulses emitted by said photodiode.

20. The photoreceiver of claim 19 wherein said measured parameter is a voltage and said threshold value of said measured parameter is a voltage.

21. The photoreceiver of claim 19 further comprising:

(a) a temperature sensor arranged to sense a temperature of said photodiode;

(b) a logic device arranged to change said threshold in response to a change in said temperature of said photodiode.

22. The photoreceiver of claim 19 further comprising:

(a) a voltage sensor arranged to sense a bias voltage applied to said photodiode;

(b) a logic device arranged to change said threshold in response to a change in said bias voltage applied to said photodiode.

23. A photoreceiver comprising:

(a) a photodiode arranged to emit an electrical pulse as a result of interaction with a photon and emitting a dark pulse absent interaction with a photon; and (b) a decision circuit to designate a pulse emitted by said photodiode as a photon induced pulse if a measured parameter of said electrical pulse exceeds a threshold value of said measured parameter, said threshold comprising a relationship of plural threshold values of said measured parameter including a value of said measured parameter selected to maximize a difference between a pulse height distribution of plural photon induced pulses emitted by said photodiode and a pulse height distribution of plural dark pulses emitted by said photodiode.

24. The photoreceiver of claim 23 wherein said measured parameter is a voltage and said threshold value of said measured parameter is a voltage.

25. A photoreceiver comprising:

(a) a first photodiode arranged to emit an electrical pulse as a result of interaction with a photon and emitting a dark pulse absent interaction with a photon;

(b) a second photodiode arranged to emit an electrical pulse as a result of interaction with a photon and emitting a dark pulse absent interaction with a photon;

(c) a summer to sum a pulse emitted by said first photodiode with a pulse emitted by said second photodiode; and (d) a decision circuit to designate an output of said summer as a photon induced pulse if a measured parameter of said output exceeds a threshold measurement of said parameter, said threshold comprising a value of said output selected to maximize a difference between a pulse height distribution of plural photon induced pulses emitted by at least one of said first photodiode and said second photodiode and a pulse height distribution of plural dark pulses emitted by at least one of said first photodiode and said second photodiode.

26. The photoreceiver of claim 25 wherein said measured parameter is a voltage and said threshold measurement of said parameter comprises a voltage.

* * * * *